US006982696B1

(12) United States Patent
Shahoian

(10) Patent No.: US 6,982,696 B1
(45) Date of Patent: Jan. 3, 2006

(54) MOVING MAGNET ACTUATOR FOR PROVIDING HAPTIC FEEDBACK

(75) Inventor: Erik J. Shahoian, San Ramon, CA (US)

(73) Assignee: Immersion Corporation, San Jose, CA (US)

( * ) Notice: Subject to any disclaimer, the term of this patent is extended or adjusted under 35 U.S.C. 154(b) by 100 days.

(21) Appl. No.: 09/608,130

(22) Filed: Jun. 30, 2000

Related U.S. Application Data

(60) Provisional application No. 60/142,155, filed on Jul. 1, 1999.

(51) Int. Cl.
*G09G 5/00* (2006.01)

(52) U.S. Cl. ...................... 345/156; 345/168; 345/173; 715/701; 715/702

(58) Field of Classification Search ................ 345/156, 345/157, 158, 159, 163, 167, 168, 173; 341/20; 715/700, 701, 702
See application file for complete search history.

(56) References Cited

U.S. PATENT DOCUMENTS

| | | | | |
|---|---|---|---|---|
| 2,972,140 | A | | 2/1961 | Hirsch |
| 3,157,853 | A | | 11/1964 | Hirsch |
| 3,220,121 | A | | 11/1965 | Cutler |
| 3,497,668 | A | | 2/1970 | Hirsch |
| 3,517,446 | A | | 6/1970 | Corlyon et al. |
| 3,623,064 | A | | 11/1971 | Kagan |
| 3,902,687 | A | | 9/1975 | Hightower |
| 3,903,614 | A | | 9/1975 | Diamond et al. |
| 3,911,416 | A | | 10/1975 | Feder |
| 4,160,508 | A | | 7/1979 | Salisbury, Jr. |
| 4,197,488 | A | | 4/1980 | Kant |
| 4,236,325 | A | | 12/1980 | Hall et al. |
| 4,262,549 | A | | 4/1981 | Schwellenbach |
| 4,266,785 | A | * | 5/1981 | Burrus ....................... 369/216 |
| 4,333,070 | A | | 6/1982 | Barnes |
| 4,464,117 | A | | 8/1984 | Forest |
| 4,484,191 | A | | 11/1984 | Vavra |
| 4,513,235 | A | | 4/1985 | Acklam et al. |

(Continued)

FOREIGN PATENT DOCUMENTS

| | | |
|---|---|---|
| JP | H2-185278 | 7/1990 |

(Continued)

OTHER PUBLICATIONS

Baigrie, "Electric Control Loading—A Low Cost, High Performance Alternative," Proceedings, pp. 247-254, Nov. 6-8, 1990.

(Continued)

*Primary Examiner*—Henry N. Tran
*Assistant Examiner*—Jean Lesperance
(74) *Attorney, Agent, or Firm*—Kilpatrick Stockton LLP

(57) ABSTRACT

A moving magnet actuator for providing haptic feedback. The actuator includes a grounded core member, a coil is wrapped around a central projection of the core member, and a magnet head positioned so as to provide a gap between the core member and the magnet head. The magnet head is moved in a degree of freedom based on an electromagnetic force caused by a current flowed through the coil. An elastic material, such as foam, is positioned in the gap between the magnet head and the core member, where the elastic material is compressed and sheared when the magnet head moves and substantially prevents movement of the magnet head past a range limit that is based on the compressibility and shear factor of the material. Flexible members can also be provided between the magnet head and the ground member, where the flexible members flex to allow the magnet head to move, provide a centering spring force to the magnet head, and limit the motion of the magnet head.

20 Claims, 5 Drawing Sheets

U.S. PATENT DOCUMENTS

| | | | |
|---|---|---|---|
| 4,581,491 A | | 4/1986 | Boothroyd |
| 4,599,070 A | | 7/1986 | Hladky et al. |
| 4,638,830 A | * | 1/1987 | Brown et al. ................. 137/83 |
| 4,708,656 A | | 11/1987 | De Vries et al. |
| 4,713,007 A | | 12/1987 | Alban |
| 4,794,392 A | | 12/1988 | Selinko |
| 4,839,544 A | * | 6/1989 | Sakai .......................... 310/12 |
| 4,874,998 A | | 10/1989 | Hollis, Jr |
| 4,879,556 A | | 11/1989 | Duimel |
| 4,891,764 A | | 1/1990 | McIntosh |
| 4,930,770 A | | 6/1990 | Baker |
| 4,934,694 A | | 6/1990 | McIntosh |
| 5,019,761 A | | 5/1991 | Kraft |
| 5,022,384 A | | 6/1991 | Freels |
| 5,022,407 A | | 6/1991 | Horch et al. |
| 5,023,861 A | * | 6/1991 | Champagne et al. ....... 720/682 |
| 5,035,242 A | | 7/1991 | Franklin |
| 5,038,089 A | | 8/1991 | Szakaly |
| 5,078,152 A | | 1/1992 | Bond |
| 5,136,194 A | | 8/1992 | Oudet et al. |
| 5,146,566 A | | 9/1992 | Hollis, Jr. et al. |
| 5,165,897 A | | 11/1992 | Johnson |
| 5,175,459 A | | 12/1992 | Danial et al. |
| 5,212,473 A | | 5/1993 | Louis |
| 5,240,417 A | | 8/1993 | Smithson et al. |
| 5,271,290 A | | 12/1993 | Fischer |
| 5,275,174 A | | 1/1994 | Cook |
| 5,283,970 A | | 2/1994 | Aigner |
| 5,299,810 A | | 4/1994 | Pierce |
| 5,309,140 A | | 5/1994 | Everett |
| 5,334,027 A | | 8/1994 | Wherlock |
| 5,396,266 A | | 3/1995 | Brimahall |
| 5,436,622 A | | 7/1995 | Gutman et al. |
| 5,437,607 A | | 8/1995 | Taylor |
| 5,466,213 A | | 11/1995 | Hogan |
| 5,492,312 A | | 2/1996 | Carlson |
| 5,532,585 A | | 7/1996 | Oudet et al. |
| 5,547,382 A | | 8/1996 | Yamasaki |
| 5,575,761 A | | 11/1996 | Hajianpour |
| 5,656,901 A | | 8/1997 | Kurita |
| 5,687,080 A | | 11/1997 | Hoyt et al. |
| 5,691,898 A | | 11/1997 | Rosenberg et al. |
| 5,766,016 A | | 6/1998 | Sinclair |
| 5,785,630 A | | 7/1998 | Bobick et al. |
| 5,790,108 A | | 8/1998 | Salcudean et al. |
| 5,805,140 A | | 9/1998 | Rosenberg et al. |
| 5,857,492 A | * | 1/1999 | Salamun .................. 137/636.1 |
| 6,002,184 A | | 12/1999 | Delson et al. |
| 6,050,718 A | | 4/2000 | Schena et al. |
| 6,069,417 A | * | 5/2000 | Yuan et al. ................... 310/12 |
| 6,111,577 A | | 8/2000 | Zilles et al. |
| 6,160,489 A | | 12/2000 | Perry et al. |
| 6,163,092 A | * | 12/2000 | Soultanian ................... 310/15 |
| 6,166,723 A | | 12/2000 | Schena et al. |
| 6,199,587 B1 | * | 3/2001 | Shlomi et al. ........... 137/625.5 |
| 6,201,533 B1 | | 3/2001 | Rosenberg et al. |
| 6,219,034 B1 | | 4/2001 | Elbing et al. |
| 6,259,382 B1 | * | 7/2001 | Rosenberg ................... 341/20 |
| 6,271,833 B1 | | 8/2001 | Rosenberg et al. |
| 6,323,494 B1 | * | 11/2001 | Lee ....................... 250/442.11 |
| 6,422,941 B1 | | 7/2002 | Thorner et al. |

FOREIGN PATENT DOCUMENTS

| | | |
|---|---|---|
| JP | H4-8381 | 1/1992 |
| JP | H5-192449 | 8/1993 |
| JP | H7-24147 | 1/1995 |

OTHER PUBLICATIONS

Iwata, Pen-based Haptic Virtual Environment, 0-7803-1363-1/93 IEEE, pp 287-292, 1993.

Russo, "The Design and Implementation of a Three Degree of Freedom Force Output Joystick," MIT Libraries Archives Aug. 14, 1990, pp. 1-131, May 1990.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Jones et al., "A perceptual analysis of stiffness," ISSN 0014-4819 Springer International (Springer-Verlag); Experimental Brain Research, vol. 79, No. 1, pp. 150-156, 1990.

Burdea et al., "Distributed Virtual Force Feedback, Lecture Notes for Workshop on Force Display in Virtual Environments and its Application to Robotic Teleoperation," 1993 IEEE International conference on Robotics and Automation, pp. 25-44, May 2, 1993.

Snow et al., "Model-X Force-Reflecting-Hand-Controller," NT Control No. MPO-17851; JPL Case No. 5348, pp. 1-4, Jun. 15, 1989.

Ouh-Young, "Force Display in Molecular Docking," Order No. 9034744, p. 1-369, 1990.

Tadros, Control System Design for a Three Degree of Freedom Virtual Environment Simulator Using Motor/Brake Pair Actuators, MIT Archive © Massachusetts Institute of Technology, pp. 1-88, Feb. 1990.

Caldwell et al., "Enhanced Tactile Feedback (Tele-Taction) Using a Multi-Functional Sensory System," 1050-4729/93, pp. 955-960, 1993.

Adelstein, "Design and Implementation of a Force Reflecting Manipulandum for Manual Control research," DSC-vol. 42, Advances in Robotics, Edited by H. Kazerooni, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42, Advances in Robotics, pp. 55-61, ASME 1992.

Russo, "Controlling Dissipative Magnetic Particle Brakes in Force Reflective Devices," DSC-vol. 42, Advances in Robotics, pp. 63-70, ASME 1992.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Adelstein, "A Virtual Environment System For The Study of Human Arm Tremor," Ph.D. Dissertation, Dept. of Mechanical Engineering, MIT, Jun. 1989.

Bejczy, "Sensors, Controls, and Man-Machine Interface for Advanced Teleoperation," Science, vol. 208, No. 4450, pp. 1327-1335, 1980.

Bejczy, "Generalization of Bilateral Force-Reflecting Control of Manipulators," Proceedings Of Fourth CISM-IFToMM, Sep. 8-12, 1981.

McAffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.
Jocobsen et al., "High Performance, Dextrous Telerobotic Manipulator With Force Reflection," Intervention/ROV '91 Conference & Exposition, Hollywood, Florida, May 21-23, 1991.
Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.
IBM Technical Disclosure Bulletin, "Mouse Ball-Actuating Device With Force and Tactile Feedback," vol. 32, No. 9B, Feb. 1990.
Terry et al., "Tactile Feedback In A Computer Mouse," Proceedings of fourteenth Annual Northeast Bioengineering Conference, University of New Hampshire, Mar. 10-11, 1988.
Howe, "A Force-Reflecting Teleoperated Hand System for the Study of Tactile Sensing in Precision Manipulation," Proceedings of the 1992 IEEE International Conference on Robotics and Automation, Nice, France, May 1992.
Eberhardt et al., "OMAR—A Haptic display for speech perception by deaf and deaf-blind individuals," IEEE Virtual Reality Annual International Symposium, Seattle, WA, Sep. 18-22, 1993.
Rabinowitz et al., "Multidimensional tactile displays: Identification of vibratory intensity, frequency, and contactor area," Journal of The Acoustical Society of America, vol. 82, No. 4, Oct. 1987.
Bejczy et al., "Kinesthetic Coupling Between Operator and Remote Manipulator," International Computer Technology Conference, The American Society of Mechanical Engineers, San Francisco, CA, Aug. 12-15, 1980.
Bejczy et al., "A Laboratory Breadboard System For Dual-Arm Teleoperation," SOAR '89 Workshop, JSC, Houston, TX, Jul. 25-27, 1989.
Ouh-Young, "A Low-Cost Force Feedback Joystick and Its Use in PC Video Games," IEEE Transactions on Consumer Electronics, vol. 41, No. 3, Aug. 1995.
Marcus, "Touch Feedback in Surgery," Proceedings of Virtual Reality and Medicine The Cutting Edge, Sep. 8-11, 1994.
Bejczy, et al., "Universal Computer Control System (UCCS) For Space Telerobots," CH2413-3/87/0000/0318501.00 1987 IEEE, 1987.
Patrick, "Design, Construction, and Testing of a Fingertip Tactile Display for Interaction with Virtual and Remote Environments," Master of Science Thesis, MIT, Nov. 8, 1990.
Cadler, "Design of A Force-Feedback Touch-Introducing Actuator For Teleoperator Robot Control," Bachelor of Science Thesis, MIT, Jun. 23, 1983.
Wiker, "Teletouch Display Development: Phase 1 Report," Technical Report 1230, Naval Ocean Systems Center, San Diego, Apr. 17, 1989.
Bliss, "Optical-to-Tactile Image Conversion for the Blind," IEEE Transactions on Man-Machine Systems, vol. MMS-11, No. 1, Mar. 1970.
Johnson, "Shape-Memory Alloy Tactile Feedback Actuator," Armstrong Aerospace Medical Research Laboratory, AAMRL-TR-90-039, Aug., 1990.
Kontarinis et al., "Tactile Display of Vibratory Information in Teleoperation and Virtual Environments," PRESENCE, 4(4):387-402, 1995.
Kontarinis et al., "Tactile Display of Vibratory Information in Teleoperation and Virtual Environments," PRESENCE, vol. 4, No. 4, pp. 387-402, 1995.
Lake, "Cyberman from Logitech," GameBytes, 1994.
"Taking a Joystick Ride", Computer Currents, Tim Scannell, Nov. 1994, Boston Edition, vol. 9 No. 11.
"Coaxial Control Shaker Part No. C-25502," Safe Flight Instrument Corporation, 26 pages, Jul. 1, 1967; Revised Jan. 28, 2002.

* cited by examiner

MOVING MAGNET ACTUATOR FOR PROVIDING HAPTIC FEEDBACK

CROSS REFERENCE TO RELATED APPLICATIONS

This application claims priority to U.S. Provisional Application No. 60/142,155, filed Jul. 1, 1999, entitled, "Providing Vibration Forces in Force Feedback Devices," and which is incorporated by reference herein.

This invention was made with government support under Contract Number N00014-98-C-0220, awarded by the Office of Naval Research. The government has certain rights in this invention.

BACKGROUND OF THE INVENTION

The present invention relates generally to producing forces in force feedback interface devices, and more particularly to the output and control of vibrations and similar force sensations from actuators in a force feedback interface device.

Using an interface device, a user can interact with an environment displayed by a computer system to perform functions and tasks on the computer, such as playing a game, experiencing a simulation or virtual reality environment, using a computer aided design system, operating a graphical user interface (GUI), or otherwise influencing events or images depicted on the screen. Common human-computer interface devices used for such interaction include a joystick, mouse, trackball, steering wheel, stylus, tablet, pressure-sensitive ball, or the like, that is connected to the computer system controlling the displayed environment.

In some interface devices, haptic or tactile feedback is also provided to the user, also known as "force feedback." These types of interface devices can provide physical sensations which are felt by the user using the controller or manipulating the physical object of the interface device. One or more motors or other actuators are used in the device and are connected to the controlling computer system. The computer system controls forces on the force feedback device in conjunction and coordinated with displayed events and interactions on the host by sending control signals or commands to the force feedback device and the actuators.

Many low cost force feedback devices provide forces to the user by vibrating the manipulandum and/or the housing of the device that is held by the user. The output of simple vibration force feedback requires less complex hardware components and software control over the force-generating elements than does more sophisticated haptic feedback. For example, in many current controllers for game consoles such as the Sony Playstation and the Nintendo 64, a motor is included in the controller which is energized to provide the vibration forces. An eccentric mass is positioned on the shaft of the motor, and the shaft is rotated quickly to cause the motor and the housing of the controller to vibrate. The host computer (console) provides commands to the controller to turn the vibration on or off or to increase or decrease the frequency of the vibration by varying the rate of rotation of the motor. These current implementations of vibrotactile feedback, however, tend to be limited and produce low-bandwidth vibrations that tend to all feel the same, regardless of the different events and signals used to command them. The vibrations that these implementations produce also cannot be significantly varied, thus severely limiting the force feedback effects which can be experienced by a user of the device.

SUMMARY OF THE INVENTION

The present invention is directed to moving magnet actuators that provide haptic sensations in a haptic feedback device that is interfaced with a host computer. The present invention provides actuators that output high magnitude, high bandwidth vibrations for more compelling force effects.

More specifically, the present invention relates to an actuator for providing vibration forces in a haptic feedback device. The actuator includes a core member that is grounded to a ground member. A coil is wrapped around a central projection of the core member, and a magnet head is positioned so as to provide a gap between the core member and the magnet head. The magnet head is moved in a degree of freedom based on an electromagnetic force caused by a current flowed through the coil. An elastic material is positioned in the gap between the magnet head and the core member, where the elastic material is compressed and sheared when the magnet head moves and substantially prevents movement of the magnet head past a range limit, the range limit based on an amount which the elastic material may be compressed and sheared.

Preferably, the elastic material is a material such as foam. The actuator can be driven by a drive signal that causes said magnet head to oscillate and produce a vibration in the ground member. The ground member can be a housing of the haptic feedback device, such as a gamepad controller. In some embodiments, at least one flexible member can also be coupled between the magnet head and the ground member to allow the magnet head to move in the degree of freedom. The degree of freedom of the magnet head can be linear or rotary.

In another aspect of the present invention, an actuator for providing vibration forces in a force feedback device includes a core member that is grounded to a ground member, a coil wrapped around a central projection of the core member, and a magnet head positioned adjacent to the core member, where the magnet head is moved in a degree of freedom based on an electromagnetic force caused by a current flowed through the coil. At least one flexible member is coupled between the magnet head and the ground member, where the flexible member(s) flex to allow the magnet head to move in the degree of freedom and provide a centering spring force to the magnet head. The flexible members limit the motion of the magnet head such that the magnet head does not impact a hard surface. The flexible members can be coupled between the magnet head and a ground surface to which the core member is coupled, or can be coupled between the magnet head and a ground surface to a side of the core member. The flexible members can also be coupled to a housing of the actuator as the ground surface. The degree of freedom of the magnet head can be linear or rotary. An elastic material can also be positioned in a gap between magnet head and core member which is compressed and sheared when the magnet head moves. A haptic feedback device including any of the above embodiments of actuator is also described.

The present invention advantageously provides an actuator for a haptic feedback device that can output high quality vibrotactile sensations. Both the frequency and amplitude of the vibrations can be controlled using bi-directional control, and features such as the elastic material and flexures contribute to a high quality and high bandwidth vibration force output.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
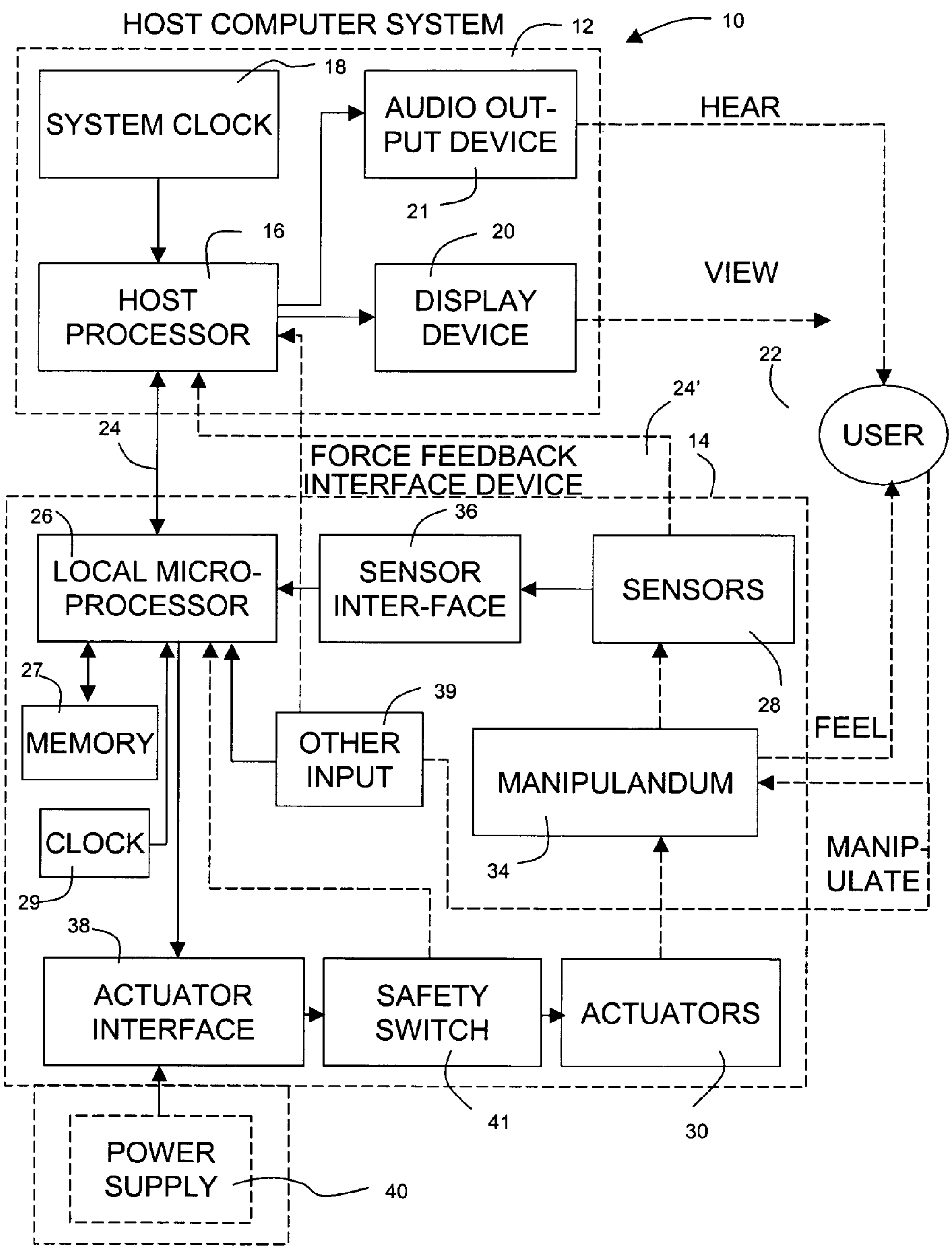
FIG. 1 is a block diagram of a haptic feedback system suitable for use with the haptic feedback device of the present invention.

FIG. 1 is a block diagram illustrating a force feedback interface system 10 for use with the present invention controlled by a host computer system. Interface system 10 includes a host computer system 12 and an interface device 14.

Host computer system 12 can be any of a variety of computer systems, such as a home video game systems (game console), e.g. systems available from Nintendo, Sega, or Sony. Other types of computers may also be used, such as a personal computer (PC, Macintosh, etc.), a television "set top box" or a "network computer," a workstation, a portable and/or handheld game device or computer, etc. Host computer system 12 preferably implements a host application program with which a user 22 is interacting via peripherals and interface device 14. For example, the host application program can be a video or computer game, medical simulation, scientific analysis program, operating system, graphical user interface, or other application program that utilizes force feedback. Typically, the host application provides images to be displayed on a display output device, as described below, and/or other feedback, such as auditory signals.

Host computer system 12 preferably includes a host microprocessor 16, a clock 18, a display screen 20, and an audio output device 21. Microprocessor 16 can be one or more of any of well-known microprocessors. Random access memory (RAM), read-only memory (ROM), and input/output (I/O) electronics are preferably also included in the host computer. Display screen 20 can be used to display images generated by host computer system 12 or other computer systems, and can be a standard display screen, television, CRT, flat-panel display, 2-D or 3-D display goggles, or any other visual interface. Audio output device 21, such as speakers, is preferably coupled to host microprocessor 16 via amplifiers, filters, and other circuitry well known to those skilled in the art and provides sound output to user 22 from the host computer 12. Other types of peripherals can also be coupled to host processor 16, such as storage devices (hard disk drive, CD ROM/DVD-ROM drive, floppy disk drive, etc.), communication devices, printers, and other input and output devices. Data for implementing the interfaces of the present invention can be stored on computer readable media such as memory (RAM or ROM), a hard disk, a CD-ROM or DVD-ROM, etc.

An interface device 14 is coupled to host computer system 12 by a bi-directional bus 24. Interface device 14 can be a gamepad controller, joystick controller, mouse controller, steering wheel controller, or other device which a user may manipulate to provide input to the computer system and experience force feedback. The bi-directional bus sends signals in either direction between host computer system 12 and the interface device. An interface port of host computer system 12, such as an RS232 or Universal Serial Bus (USB) serial interface port, parallel port, game port, etc., connects bus 24 to host computer system 12. Alternatively, a wireless communication link can be used.

Interface device 14 includes a local microprocessor 26, sensors 28, actuators 30, a user object 34, optional sensor interface 36, an actuator interface 38, and other optional input devices 39. Local microprocessor 26 is coupled to bus 24 and is considered local to interface device 14 and is dedicated to force feedback and sensor I/O of interface device 14. Microprocessor 26 can be provided with software instructions to wait for commands or requests from computer host 12, decode the command or request, and handle/control input and output signals according to the command or request. In addition, processor 26 preferably operates independently of host computer 12 by reading sensor signals and calculating appropriate forces from those sensor signals, time signals, and stored or relayed instructions selected in accordance with a host command. Suitable microprocessors for use as local microprocessor 26 include the MC68HC7111E9 by Motorola, the PIC16C74 by Microchip, and the 82930AX by Intel Corp., for example. Microprocessor 26 can include one microprocessor chip, or multiple processors and/or co-processor chips, and/or digital signal processor (DSP) capability.

Microprocessor 26 can receive signals from sensors 28 and provide signals to actuators 30 of the interface device 14 in accordance with instructions provided by host computer 12 over bus 24. For example, in a preferred local control embodiment, host computer 12 provides high level supervisory commands to microprocessor 26 over bus 24, and microprocessor 26 manages low level force control loops to sensors and actuators in accordance with the high level commands and independently of the host computer 12. The force feedback system thus provides a host control loop of information and a local control loop of information in a distributed control system. This operation is described in greater detail in U.S. Pat. No. 5,734,373, incorporated herein by reference. Microprocessor 26 can also receive commands from any other input devices 39 included on interface apparatus 14, such as buttons, and provides appropriate signals to host computer 12 to indicate that the input information has been received and any information included in the input information. Local memory 27, such as RAM and/or ROM, can be coupled to microprocessor 26 in interface device 14 to store instructions for microprocessor 26 and store temporary and other data (and/or registers of the microprocessor 26 can store data). In addition, a local clock 29 can be coupled to the microprocessor 26 to provide timing data.

Sensors 28 sense the position, motion, and/or other characteristics of a user manipulandum 34 of the interface device 14 along one or more degrees of freedom and provide signals to microprocessor 26 including information representative of those characteristics. Rotary or linear optical encoders, potentiometers, photodiode or photoresistor sensors, velocity sensors, acceleration sensors, strain gauge, or other types of sensors can be used. Sensors 28 provide an electrical signal to an optional sensor interface 36, which can be used to convert sensor signals to signals that can be interpreted by the microprocessor 26 and/or host computer system 12. For example, these sensor signals can be used by the host computer to influence the host application program, e.g. to steer a race car in a game or move a cursor across the screen.

One or more actuators 30 transmit forces to the interface device 14 and/or to manipulandum 34 of the interface device 14 in response to signals received from microprocessor 26. In one embodiment, the actuators output forces on the housing of the interface device 14 which is handheld by the user, so that the forces are transmitted to the manipulandum through the housing. Alternatively, the actuators can be directly coupled to the manipulandum 34. Actuators 30 can include two types: active actuators and passive actuators. Active actuators include linear current control motors, stepper motors, pneumatic/hydraulic active actuators, a torquer (motor with limited angular range), voice coil actuators, and other types of actuators that transmit a force to move an object. Passive actuators can also be used for actuators 30, such as magnetic particle brakes, friction brakes, or pneumatic/hydraulic passive actuators. Active actuators are preferred in the embodiments of the present invention. Actuator interface 38 can be connected between actuators 30 and microprocessor 26 to convert signals from microprocessor 26 into signals appropriate to drive actuators 30, as is described in greater detail below.

Other input devices 39 can optionally be included in interface device 14 and send input signals to microprocessor 26 or to host processor 16. Such input devices can include buttons, dials, switches, levers, or other mechanisms. For example, in embodiments where the device 14 is a gamepad, the various buttons and triggers can be other input devices 39. Or, if the user manipulandum 34 is a joystick, other input devices can include one or more buttons provided, for example, on the joystick handle or base. Power supply 40 can optionally be coupled to actuator interface 38 and/or actuators 30 to provide electrical power. A safety switch 41 is optionally included in interface device 14 to provide a mechanism to deactivate actuators 30 for safety reasons.

Manipulandum (or "user object") 34 is a physical object, device or article that may be grasped or otherwise contacted or controlled by a user and which is coupled to interface device 14. By "grasp", it is meant that users may releasably engage, contact, or grip a portion of the manipulandum in some fashion, such as by hand, with their fingertips, or even orally in the case of handicapped persons. The user 22 can manipulate and move the object along provided degrees of freedom to interface with the host application program the user is viewing on display screen 20. Manipulandum 34 can be a joystick, mouse, trackball, stylus (e.g. at the end of a linkage), steering wheel, sphere, medical instrument (laparoscope, catheter, etc.), pool cue (e.g. moving the cue through actuated rollers), hand grip, knob, button, or other object.

In a gamepad embodiment, the manipulandum can be a fingertip joystick or similar device. Some gamepad embodiments may not include a joystick, so that manipulandum 34 can be a button pad or other device for inputting directions. In other embodiments, mechanisms can be used to provide degrees of freedom to the manipulandum, such as gimbal mechanisms, slotted yoke mechanisms, flexure mechanisms, etc. Various embodiments of suitable mechanisms are described in U.S. Pat. Nos. 5,767,839, 5,721,566, 5,623,582, 5,805,140, 5,825,308, and patent application Ser. Nos. 08/965,720, 09/058,259, 09/156,802, 09/179,382, and 60/133,208, all incorporated herein by reference.

Moving Magnet Actuator

Figure 2:
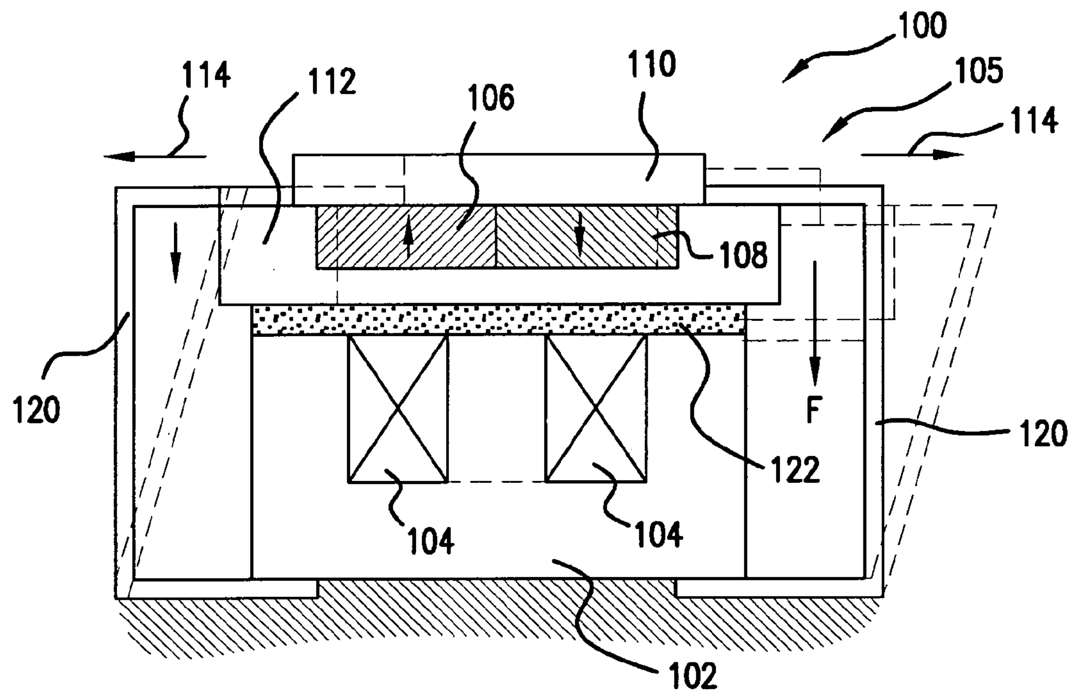
FIG. 2 is a side elevational view of one embodiment of a linear actuator of the present invention.

FIG. 2 is a side elevational view of an actuator 100 of the present invention which can be included in a handheld controller 14 or coupled to manipulandum 34 as actuator 30 for providing force feedback to the user of the controller 14 and/or manipulandum 34 in the interface device 14 of FIG. 1. In one embodiment, the actuator 100 can be coupled to the housing of the interface device 14, e.g. the housing of a handheld gamepad controller as used with console game systems or personal computers. In other embodiments, the actuator can be coupled to a manipulandum 34 or other member.

Actuator 100 is a moving-magnet actuator in which a grounded metal core 102 includes a wire coil 104 that is wrapped around a central projection of the core as shown (shown in cross section in FIG. 2). A magnet head 105 includes two magnets 106 and 108 which have opposite polarities facing the coil 104 and are coupled together as shown and spaced from the coil 104 and core 102. Magnet head 105 also includes a metal piece 110 coupled to the magnets 106 and 108 to provide a flux return path for the magnetic flux of the actuator. A plastic housing 112 provides a structure for the magnets and metal piece of the magnet head 105.

The actuator 100 operates by producing a force on the magnet head 105 in the linear directions indicated by arrows 114 when a current is flowed through the coil 104. The direction of the current dictates the direction of force on the head 105. The operation of E-core actuators similar to the components 102–110 of actuator 100 is described in greater detail in co-pending application Ser. No. 60/107,267, incorporated herein by reference, and in U.S. Pat. No. 5,136,194. The magnet head 105 can be moved to either side from the center position shown in FIG. 2.

Actuator 100 is intended to be used in the present invention for producing vibrations which are transmitted to the housing of the interface device 14 and/or to a user manipulandum 34. In other embodiments, the actuator 100 can be used to produce other force feedback effects. The motion of the head 105 is desired to be constrained to a particular range of motion to provide an oscillatory motion as desired for the bi-directional mode of operation as described above. However, if mechanical stops are provided to limit the range of motion of the magnet head 105, the impact of the head 105 with the stops causes harmonics and disturbances in the vibration force feedback which the user can feel.

To reduce the disruptive effect of such hard stops, the present invention provides several features. Flexures 120 are coupled between the grounded core 102 and the moving magnet head 105, and can flex in the directions shown to allow motion of the magnet head 105 in its linear degree of freedom. The flexures can flex to allow the magnet head to move to other positions, e.g. one different position is indicated by the dashed lines. The flexures 120 provide a spring resilience to the motion of the magnet head 105, such that when the magnet head 105 moves closer to a limit of motion to either side, the flexures resist the motion like a spring and bias the head back toward the center position. This helps limit the motion of the magnet head 105 without using hard stops.

Furthermore, the actuator 100 of the present invention includes an elastic material 122 positioned between the grounded core 102 and the magnet head 105, such as foam. The foam material may be physically coupled to either the core 102 or to the head 105, or to neither the core or the head. The magnetic attractive force F between the core 102 and the magnets 106 and 108 causes slight compression of the foam and keeps it in position. The foam allows the magnet head 105 to move in its linear degree of freedom since the foam is a flexible, deformable material. As the magnet head 105 moves to one side, the foam compresses and shears and resists the motion of the head to a greater degree as the head moves a greater distance. The flexures 120 cause the magnet head 105 to move closer to core 102 as the head 105 moves to either side. At some point, the foam 122 is compressed to such an extent that no further motion of the head 105 is substantially allowed away from the center position, and the limit to motion is effectively reached. In other embodiments, other elastic or compressible materials having a modulus or otherwise similar to foam may be used, such as rubber, a fluid with viscoelastic properties, etc.

The foam and flexure structure described above provides limits to the motion of the magnet head without causing a disturbance in the force feedback that would be caused if the head 105 were to impact a surface. The foam 122 provides increasing resistance to motion of the head to provide an actuator limit, based on the compressibility and shear factor of the foam. Furthermore, the foam is an inexpensive material that is simple to assemble between the core 102 and the head 105. In addition, the frequency response of the actuator 100 can be adjusted by selecting a particular foam type, e.g. a foam having a higher or lower compliance or compressibility.

Actuator 100 can be used to provide the oscillating vibrations for a bi-directional mode of vibration force feedback. In such a mode, the magnet head 105 is oscillated in the linear degree of freedom, producing a vibration that is transmitted from the actuator to the housing of the device 14 to which the actuator is coupled. A drive waveform that changes between positive and negative signs can be provided to the actuator to cause the oscillations. If a lower amplitude drive waveform is used, then the magnitude of vibration output is correspondingly lower. This allows the controller of the drive waveform to adjust the magnitude of vibration to a desired level within the allowed magnitude range by adjusting the magnitude of the waveform. The controller can also adjust the frequency of the drive waveform independently of the amplitude to adjust the frequency of vibration. This allows different frequency vibrations to be output independently of the magnitude of those vibrations. The drive waveform can be supplied by the local microprocessor 26, actuator interface 38, or host computer 12 directly. The drive signal can be supplied by a well-known H-bridge circuit or other amplifier circuit, as also disclosed in copending application no. 09/608,125, filed concurrently herewith, entitled, “Controlling Vibrotactile Sensations for Haptic Feedback Devices,” which is incorporated by reference herein.

The linear actuator 100 provides a greater magnitude of vibrations at higher frequencies (assuming the waveform magnitude is held constant). This gain at higher frequencies is due primarily to the vibration occurring at the resonance frequency of the mechanical system including actuator, foam, housing, etc., and, if desired, can be compensated for in other embodiments to obtain a more flat response by providing compensating frequencies that will provide the desired response (e.g. from a look-up table or firmware).

Figure 3:
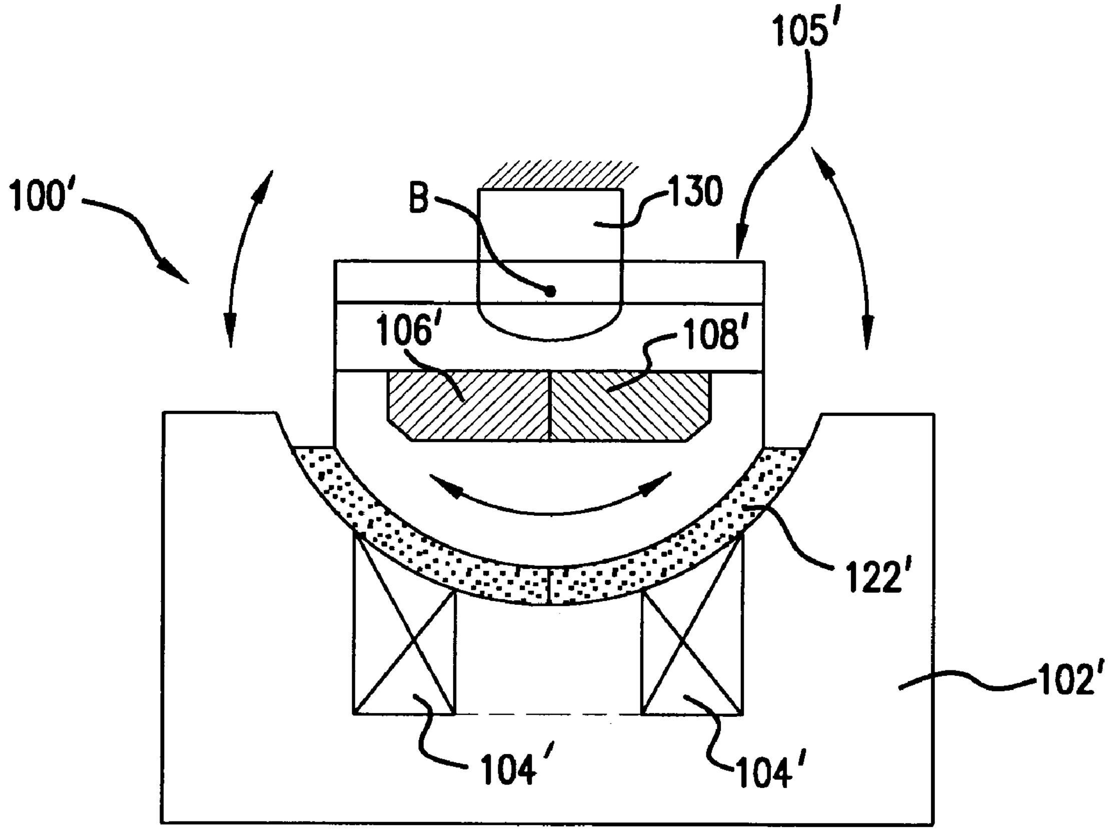
FIG. 3 is a side elevational view of one embodiment of a rotary actuator of the present invention.

FIG. 3 is a side elevational view of an alternate embodiment 100' of the actuator 100 shown in FIG. 2. Actuator 100 includes a core 102', a coil 104'; and a magnetic head 105' substantially similar to like components of the actuator 100 of FIG. 2. However, actuator 100' provides rotational force and motion instead of the linear motion of actuator 100. Thus, the core 102' and the magnetic head 105' have opposed curved surfaces, and the foam 122' fills the gap therebetween. The magnet head 105' rotates about an axis B when current is flowed through the coil 104', and the foam 122' compresses as described above to limit the range of the head 105'. The head 105' can be rotatably coupled to a grounded member 130 to provide support for the head. Radial flexures similar to those of FIG. 4 or 5 can also be used in the embodiment of FIG. 3 to provide a spring resilience to the magnet head 105' about axis B.

Figure 4:
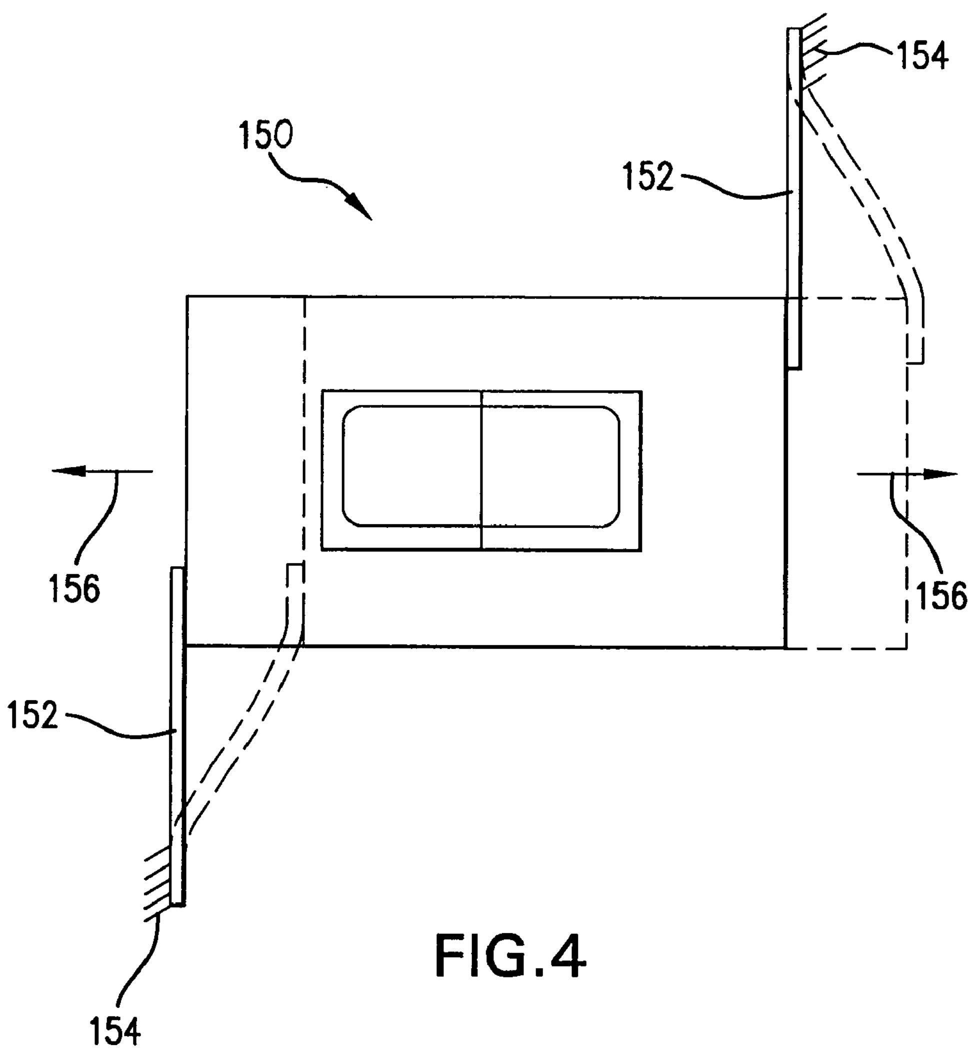
FIG. 4 is a top plan view of the actuator of FIG. 2 having flexures in a different location.

FIG. 4 is a top plan view of an alternate embodiment 150 of the actuator 100 shown in FIG. 2. The core, coil, and magnet head components are substantially similar as described with reference to FIG. 2. In this embodiment, flexures 152 are provided between the magnet head 105 and a grounded surface 154. Grounded surface 154 can be the housing of the motor itself, the housing of the controller or interface device 14, or other surface. The flexures 152 flex to accommodate the motion of the magnet head 105, as shown by the dashed lines and arrows 156.

Figure 5:
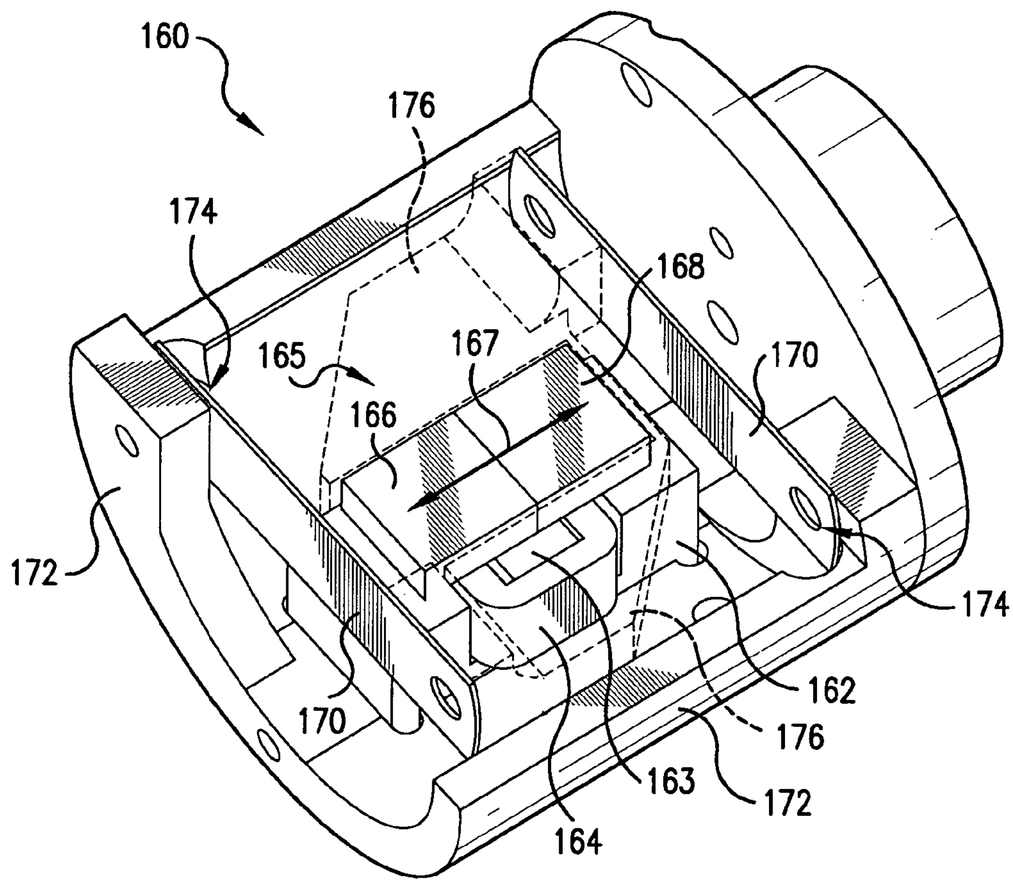
FIG. 5 is a perspective view of another embodiment of the actuator of FIG. 4.

FIG. 5 is a perspective view of one embodiment of an actuator 160 which is similar to actuator 100 and implements flexures similar to the flexures 152 of FIG. 4. Core 162 has a projecting portion 163 around which is wrapped coil 164. Magnets 166 and 168 are provided in magnet head 165 which moves linearly above the core 162 and coil 164 as indicated by arrow 167. A flexure 170 is positioned on either side of the core 162 and head 165. Each flexure 170 is coupled to the housing 172 of the motor 160 at a point 174. The other end of each flexure is coupled to the magnet head 165 by a frame or shuttle 176 (shown in dashed lines) which is coupled between the magnets 166, 168 and the flexures 170. A foam layer as described above is also preferably positioned between core 162 and head 165. When the head 165 is caused to oscillate quickly back and forth, the force is transmitted through flexures 170 to the motor housing, and from the housing to the interface device 14 held by the user.

In other embodiments of the present invention, yet other types of actuators can be used. For example, a solenoid having linear motion can be used to provide the bi-directional vibrations described above.

While this invention has been described in terms of several preferred embodiments, it is contemplated that alterations, permutations and equivalents thereof will become apparent to those skilled in the art upon a reading of the specification and study of the drawings. Furthermore, certain terminology has been used for the purposes of descriptive clarity, and not to limit the present invention.

What is claimed is:

1. A computer input device comprising an actuator, which comprises: a core member, having a central projection; a coil wrapped around said central projection; a magnet positioned so as to provide a gap between said core member and said magnet and operable to move in a degree of freedom relative to said core member; and an elastic material disposed in said gap and configured to limit a range of motion of said magnet in said degree of freedom, wherein; said core member comprises a first curved surface; said magnet comprises a second curved surface; and said elastic material is disposed in a gap formed between said first curved surface and said second curved surface.

2. A computer input device comprising an actuator, which comprises: a core member having a central projection; a coil wrapped around said central projection; a magnet positioned so as to provide a gap between said core member and said magnet; and a first flexible member attached to said core member and said magnet and configured to limit a range of motion of said magnet.

3. An actuator as recited in claim 2 further comprising an elastic material disposed in said gap.

4. An actuator as recited in claim 3, wherein said elastic material comprises foam.

5. An actuator as recited in claim 2 wherein said first flexible member is attached to said magnet and a grounded surface.

6. An actuator as recited in claim 5 wherein said grounded surface comprises an actuator housing.

7. An actuator as recited in claim 5, further comprising a controller electrically connected to said coil for generating a drive signal.

8. An actuator as recited in claim 5, further comprising a second flexible member attached to said magnet and said core member.

9. An actuator as recited in claim 5, wherein:

said core member comprises a first curved surface;

said magnet comprises a second curved surface.

10. An actuator as recited in claim 9, further comprising an elastic material positioned in a gap formed between said first curved surface and said second curved surface.

11. An actuator as recited in claim 2 wherein said magnet is configured to move linearly.

12. An actuator as recited in claim 2 wherein said magnet is configured to move rotationally.

13. A device comprising:

a manipulandum having a housing; and an actuator as recited in claim 2 coupled to said manipulandum and disposed within said housing.

14. A device as recited in claim 13, wherein said manipulandum comprises a joystick.

15. A computer input device comprising an actuator, which comprises: a core member, having a central projection; a coil wrapped around said central projection; a magnet positioned so as to provide a gap between said core member and said magnet; and a ground member attached to said core member; and a first flexible member attached to said core member and said magnet and configured to limit a range of motion of said magnet.

16. An actuator as recited in claim 15, further comprising a second flexible member attached to said magnet and said ground member.

17. An actuator as recited in claim 15, wherein said ground member comprises a grounded surface.

18. An actuator as recited in claim 17, wherein said grounded surface comprises a surface of a housing.

19. A device comprising:

a manipulandum having a housing; and an actuator as recited in claim 15 coupled to said manipulandum and disposed within said housing.

20. A device as recited in claim 19, wherein said manipulandum comprises a joystick.

* * * * *